United States Patent
Sambandan et al.

(10) Patent No.: US 8,411,075 B2
(45) Date of Patent: Apr. 2, 2013

(54) LARGE AREA ELECTRONIC SHEET AND PIXEL CIRCUITS WITH DISORDERED SEMICONDUCTORS FOR SENSOR ACTUATOR INTERFACE

(75) Inventors: Sanjiv Sambandan, Palo Alto, CA (US); William S. Wong, San Carlos, CA (US); Robert A. Street, Palo Alto, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 1210 days.

(21) Appl. No.: 12/206,690

(22) Filed: Sep. 8, 2008

(65) Prior Publication Data

US 2010/0060560 A1    Mar. 11, 2010

(51) Int. Cl.
  *G06F 3/038* (2006.01)
  *G06G 5/00* (2006.01)
(52) U.S. Cl. .......................... 345/205; 257/71
(58) Field of Classification Search .............. 345/205, 345/206, 92, 93; 257/71
See application file for complete search history.

(56) References Cited

U.S. PATENT DOCUMENTS

| | | | |
|---|---|---|---|
| 6,278,426 B1* | 8/2001 | Akiyama | 345/87 |
| 7,170,094 B2* | 1/2007 | Yamazaki et al. | 345/102 |
| 2006/0170628 A1* | 8/2006 | Yamashita et al. | 345/76 |
| 2009/0002586 A1* | 1/2009 | Kimura | 349/39 |
| 2011/0032741 A1* | 2/2011 | Takeda | 365/72 |

OTHER PUBLICATIONS

Sambandan. S., Nathan A., Circuit Techniques for Organic and Amorphous Semiconductor Based Field Effect Transistors, IEEE pp. 69-72, Apr. 2006.

\* cited by examiner

*Primary Examiner* — Julio J Maldonado
*Assistant Examiner* — Sonya D McCall Shepard
(74) *Attorney, Agent, or Firm* — Marger Johnson & McCollom PC

(57) ABSTRACT

A pixel circuit including a first transistor; a second transistor, the first transistor and the second transistor serially coupled between a first power supply terminal and a second power supply terminal; and a first capacitor coupled between a gate of the first transistor and a gate of the second transistor, and an electronic sheet including the same.

17 Claims, 7 Drawing Sheets

US 8,411,075 B2

LARGE AREA ELECTRONIC SHEET AND PIXEL CIRCUITS WITH DISORDERED SEMICONDUCTORS FOR SENSOR ACTUATOR INTERFACE

BACKGROUND

This disclosure relates to the design of an electronic sheet with disordered semiconductors for interfacing a sensor and actuator. Disordered semiconductors are those with no crystalline order such as amorphous silicon, organic and polymer semiconductors like PQT, PBTTT etc. Disordered semiconductors are of interest because their deposition on very large area substrates is inexpensive compared to crystalline semiconductors. Moreover, they can be deposited at low temperatures on flexible substrates like plastic sheets.

Typically making a circuit with disordered semiconductors is difficult since transistors such as thin film transistors or TFTs including disordered semiconductors experience a time varying threshold voltage with applied gate bias.

A pixel circuit of an electronic sheet can store the information from the sensor, amplify and level shift this information and pass it onto the actuator. However, the storage element of the pixel circuit can typically discharge thereby losing information. In particular, a write enable transistor, a read enable transistor, or the like can have a leakage current in an off state that discharges a charge on the storage element. Moreover, drifts in threshold voltage in the transistors can lead to unstable output to the actuator.

SUMMARY

An embodiment includes a part of the pixel circuit formed using a disordered semiconductor including a first transistor; a second transistor, the first transistor and the second transistor serially coupled between a power supply and a ground; and a first capacitor coupled between a gate of the first transistor and a gate of the second transistor.

Another embodiment includes a part of the pixel circuit including multiple transistors coupled together in series; and multiple capacitors coupled to the transistors such that each transistor is coupled to each other transistor through at least one of the capacitors.

Another embodiment includes a method of operating a pixel circuit formed using a disordered semiconductor having multiple serially coupled transistors. The method includes charging a terminal of a first transistor of the serially coupled transistors to a first voltage; and charging a terminal of a second transistor of the serially coupled transistors to a second voltage.

Another embodiment includes an electronic sheet formed using a disordered semiconductor including a sensor layer including at least one sensor; a pixel circuit layer including at least one pixel circuit; and an actuator layer including at least one actuator. The pixel layer is disposed between the sensor layer and the actuator layer.

DETAILED DESCRIPTION

Embodiments include pixel circuitry and electronic sheets including such pixel circuits formed using a disordered semiconductor. In particular, embodiments include pixel circuits that are tolerant of threshold voltage shifts, noise, leakage currents, parasitic effects, or the like particular to disordered semiconductors. Because of such variability in disordered semiconductor circuits, a circuit that operated as desired in a crystalline semiconductor may not operate as desired if implemented using a disordered semiconductor. However, embodiments described below are tolerant of such effects. Moreover, the pixel circuits can introduce differential operation and level shifting.

Figure 1:
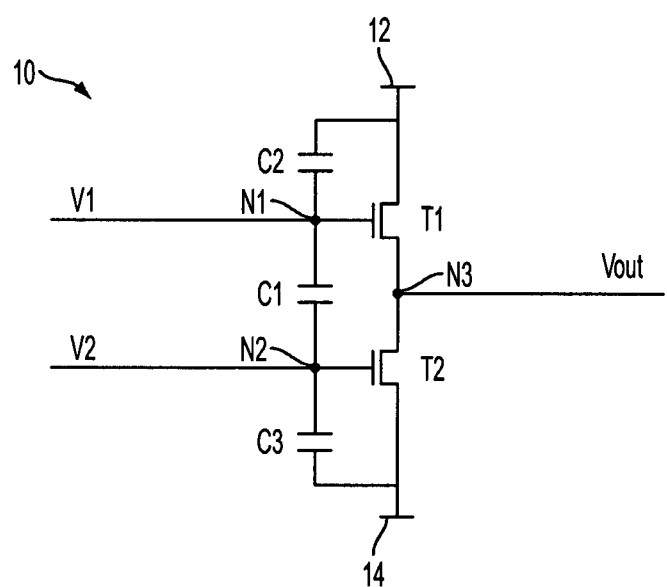
FIG. 1 is a circuit diagram of a part of the pixel circuit according to an embodiment.

FIG. 1 is a circuit diagram of a pixel circuit according to an embodiment. The pixel circuit 10 includes a first transistor T1 and a second transistor T2. The transistors T1 and T2 are serially coupled together. In this embodiment, they are serially coupled between voltage sources 12 and 14. For example, voltage source 12 can be a power supply such as VCC and voltage source 14 can be ground. In this embodiment, both transistors are n type; however the transistors could be p-type with suitable changes in polarity. As will be described below, the pixel circuit solves the problem of the effect of threshold voltage shift on the output sent to the actuator.

A capacitor C1 is coupled between transistors T1 and T2. Capacitor C2 is coupled between a terminal of transistor T1 and the voltage source 12. Capacitor C3 is coupled between a terminal of transistor T2 and voltage source 14. In this embodiment, capacitors C1, C2, and C3 are coupled to gates of the transistors T1 and T2. As a result, voltages across the terminals of transistors T1 and T2 can be maintained in a particular relationship.

The pixel circuit 10 has inputs at nodes N1 and node N2, and an output at node N3. As will be described below, an analog difference between voltages of nodes N1 and N2 can be maintained. Accordingly, the pixel circuit 10 can operate as an analog memory cell, a multi-digital-level memory cell, a one bit memory cell, or the like.

In an embodiment, a first voltage V1 is applied to node N1. A second voltage V2 is applied to node N2. Voltages V1 and V2 on nodes N1 and N2 can bias transistors T1 and T2 into saturation. The voltage at node N3 is referred to as $V_{OUT}$.

The threshold voltage in transistors T1 and T2 can shift over time. The threshold voltage is given in equation 1 where $V_T(t)$ is the threshold voltage over time, $V_{GS}$ is the gate-source voltage applied to the transistors, and $V_{TO}$ is an initial threshold voltage. $f(t)$ is a time variable factor of the threshold voltage $$V_T(t) = (V_{GS} - V_{TO})f(t) + V_{TO} \qquad (1)$$

Since transistors T1 and T2 are serially coupled together, the drain-source currents for each transistor should be substantially the same. Equation 2 is a current through transistor T1 where $I_{DS1}$ is the drain-source current, $\mu_1$ is the mobility, and $C_{OX1}$ is the insulator capacitance per unit area:

$$I_{DS1} = \mu_1 C_{OX1} \frac{w_1}{2l_1}(V_1 - V_{OUT} - V_{T1}) \quad (2)$$

However, substituting the threshold voltage of equation 1 and $V_{GS1}$ of the voltage V1 at node N1 minus the voltage $V_{OUT}$ of node N3 results in equation 3:

$$I_{DS1} = \mu_1 C_{OX1} \frac{w_1}{2l_1}(V_1 - V_{OUT} - (V_1 - V_{OUT} - V_{TO1})f(t) - V_{TO1})^2 \quad (3)$$

The drain-source current of transistor T2 can be similarly represented. Here, $V_{GS}$ of equation 1 is the gate-source voltage $V_{GS2}$ of transistor T2. $V_{GS2}$ for transistor T2 is V2 at node N2 minus the voltage of voltage source 14. Assuming that voltage source 14 is ground, the drain-source current for transistor T2 is given by equation 4:

$$I_{DS2} = \mu_2 C_{OX2} \frac{w_2}{2l_2}(V_2 - (V_2 - V_{TO2})f(t) - V_{TO2})^2 \quad (4)$$

Defining $B^2$ as in equation 5 and equating $I_{DS1}$ with $I_{DS2}$ results in equation 6:

$$B^2 = \frac{\mu_2 C_{OX2} \frac{w_2}{2l_2}}{\mu_1 C_{OX1} \frac{w_1}{2l_1}} \quad (5)$$

$$(V_1 - V_{OUT} - V_{TO1})(1 - f(t)) = B(V_2 - V_{TO2})(1 - f(t)) \quad (6)$$

As 1-f(t) cancels out, the time variability of the threshold voltage is no longer a factor. Accordingly, $V_{OUT}$ is independent of time, and based on B, $V_1$, and $V_2$ as shown in equation 7.

$$V_{OUT} = V_1 - V_{TO1} - B(V_2 - V_{TO2}) \quad (7)$$

If transistors T1 and T2 are substantially similar, the various constants that affect B will be substantially similar. Thus B will be approximately 1. In addition, the initial threshold voltages $V_{TO}$ will be substantially similar. Assuming B=1 and the initial threshold voltages are the same, equation 7 results in equation 8

$$V_{OUT} = V_1 - V_2 \quad (8)$$

That is, $V_{OUT}$, the voltage on node N3, will be the difference of voltage $V_1$ on node N1 and voltage $V_2$ on node N2. Moreover, voltage $V_{OUT}$ is substantially independent of time and substantially independent of the initial threshold voltage $V_{TO}$, including time-dependent variations in the threshold voltage.

In an embodiment, the conditions that result in the equations described above cause transistors T1 and T2 to operate in saturation. For example, with an appropriate voltage source 12, and ensuring that $V_1 > 2V_2$, transistors T1 and T2 can be operated in saturation if B=1. Accordingly, actual performance can equal or be approximated by the drain-source currents of equations 3 and 4 above.

Capacitors C1, C2, and C3 can affect the hold time and noise immunity of the pixel circuit 10. For example, capacitor C1 couples nodes N1 and N2 together. As a result, noise, clock feedthrough, or the like appearing on one node will be coupled to the other. Since similar noise appears in both voltages V1 and V2 of nodes N1 and N2, the noise cancels out of the difference between voltages V1 and V2. Thus, the difference between nodes N1 and N2 is resistant to noise. Since the voltage $V_{OUT}$ is the difference of the voltages on nodes N1 and N2, the voltage $V_{OUT}$ is resistant to noise.

Moreover, capacitors C2 and C3 can help maintain the voltages across the transistors T1 and T2. As a result, the transistors T1 and T2 can operate under more stable operating conditions. Furthermore, the additional charge storage of capacitors C1, C2, and C3 increase the pixel circuit's immunity to leakage currents.

Accordingly, to store information in the pixel circuit, nodes N1 and N2 can be charged such that voltage $V_{OUT}$ becomes the desired output voltage. That is, node N1 can be charged to voltage V1 and node N2 can be charged to voltage V2 so that the output voltage $V_{OUT}$ becomes V1−V2. The voltages at nodes N1 and N2 can be maintained so that the output voltage $V_{OUT}$ remains substantially constant. Thus, data represented by V1−V2 is stored.

In an embodiment, a pixel circuit can be based on thin film transistor (TFT) technology. The circuitry formed by TFTs can be pixelated to form memory storage structures. For example, in another an embodiment, the TFT can be an amorphous silicon TFT. In another embodiment, the TFT can be an organic TFT.

Figure 2:
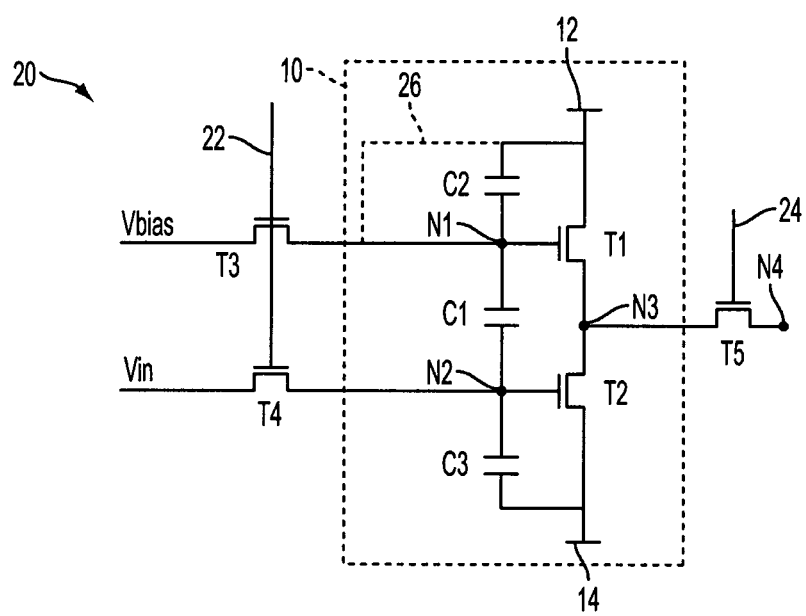
FIG. 2 is a circuit diagram illustrating read and write circuitry for the pixel circuit of FIG. 1.

FIG. 2 is a circuit diagram illustrating read and write circuitry for the pixel circuit of FIG. 1. In this embodiment, the read and write circuitry can control access to the pixel circuit 10 when operating as a memory cell. The read and write circuitry includes transistors T3, T4, and T5. Transistors T3 and T4 switch signals to nodes N1 and N2, respectively. As a result, information can be written to the pixel circuit 10. In this embodiment, to illustrate a particular application, V1 will be referred to as $V_{BIAS}$ and V2 will be referred to as $V_{IN}$. $V_{BIAS}$ can be switched to node N1 and $V_{IN}$ can be switched to node N2 through transistors T3 and T4. When $V_{BIAS}$ and $V_{IN}$ are switched to nodes N1 and N2, node N3 becomes the difference, or $V_{BIAS} - V_{IN}$. Transistors T3 and T4 can be switched off, leaving the stored charges on nodes N1 and N2. As a result, $V_{BIAS} - V_{IN}$ is maintained at node N3.

In addition to gating signals into the pixel circuit 10, the transistors T3 and T4 can be selected such that leakage currents through the transistors in the off state result in a substantially similar voltage change on both nodes N1 and N2. For example, assuming that capacitances at nodes N1 and N2 are substantially similar, transistors T3 and T4 can be selected to be substantially similar so that they have similar leakage currents. As a result, nodes N1 and N2 will both have a substantially similar change in absolute voltage. However, a voltage difference between nodes N1 and N2 will remain substantially the same. Since the voltage on node N3 is substantially equal to the voltage difference between nodes N1 and N2, the voltage on node N3 will remain substantially constant even though there are leakage currents through transistors T3 and T3.

Transistor T5 can switch the output voltage $V_{OUT}$ from node N3 to any subsequent circuitry. Although current passing through transistor T5 can change the operating characteristics of transistors T1 and/or T2 as node N4 is charged, node N3 can return to the state where voltage $V_{OUT}$ is substantially equal to $V_{BIAS} - V_{IN}$. Thus, the voltage that is read out is substantially equal to $V_{BIAS} - V_{IN}$. Moreover, when transistor T5 is turned off, node N3 can be substantially equal to $V_{BIAS} - V_{IN}$, or can return to be substantially equal to $V_{BIAS} - V_{IN}$ as the difference between the voltages on nodes N1 and N2 has not changed substantially. As a result, the pixel circuit 10 can be read non-destructively.

In this embodiment, control lines 22 and 24 are coupled to transistors T3, T4, and T5. For example, control line 22 can be a write enable signal line and control line 24 can be a read enable signal line. The control line 22 can be asserted so that transistors T3 and T4 are turned on to write information to the pixel circuit 10. Similarly, control line 24 can be asserted so that information can be read from the pixel circuit 10. In another embodiment, each of transistors T3 and T4 can have independent control lines.

In an embodiment, transistor T3 can be coupled to a bias voltage supply to supply the voltage Vbias. The bias voltage terminal can be coupled to other pixel circuits. Accordingly, the bias voltage terminal can supply the voltage Vbias to other pixel circuits.

In an embodiment, the bias voltage Vbias can be used to level shift the input voltage Vin. As described above, the voltage at node N3 is the difference between voltages $V_{BIAS}$ and $V_{IN}$, i.e. $V_{BIAS}-V_{IN}$. Accordingly, $V_{BIAS}$ directly affects the voltage at N3. The voltage $V_{BIAS}$ can be adjusted to shift a level of the voltage at node N3. For example, to increase the level of the voltage at node N3, $V_{BIAS}$ can be increased when writing to the pixel circuit 10. As a result, by changing $V_{BIAS}$, the stored voltage can be level shifted.

In addition to level shifting, the bias voltage $V_{BIAS}$ can increase the speed at which data from the pixel circuit 10 can be read. For example, as described above the voltage at node N3 that is read out of the pixel circuit 10 through transistor T5 is level shifted by $V_{BIAS}$. Thus, there is a greater potential to drive current. In contrast, the voltage used to drive the source follower in a conventional memory cell is only the stored voltage. Only the stored voltage is available for driving the source follower, resulting in a smaller drive current. Accordingly, due to the higher voltage from $V_{BIAS}$, data can be read from the pixel circuit 10 faster than with the conventional source follower.

In another embodiment, the transistor T3 can be eliminated. For example, the gate of transistor T1 can be coupled to the power supply 12. Connection 26 illustrates an alternative connection for the gate of transistors T1. In this embodiment, $V_{BIAS}$ would essentially be the voltage of voltage source 12.

Figure 3:
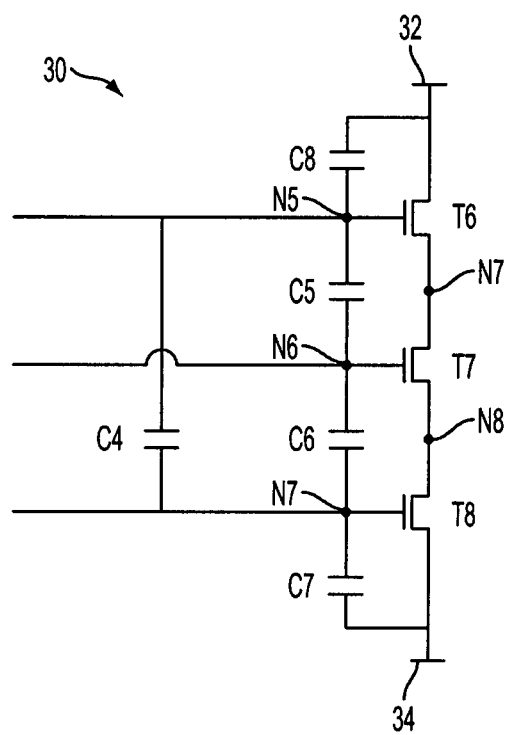
FIG. 3 is a circuit diagram of a part of the pixel circuit according to another embodiment.

FIG. 3 is a circuit diagram of a pixel circuit according to another embodiment. Pixel circuit 30 includes transistors T6-T8 coupled together in series. Capacitors C4-C6 are coupled to the transistors T6-T8 such that each transistor is coupled to each other transistor through at least one of the capacitors C4-C6. In this embodiment, the capacitors C4-C6 coupled the gates of transistors T6-T8. For each pair of transistors from among transistors T6-T8, gates of the pair of transistors are coupled through one of the capacitors C4-C6. Accordingly, any noise, feedthrough, or other perturbation on a voltage at one of the nodes N5-N7 will be coupled to the other nodes. As a result, a voltage difference between any two nodes can be maintained.

Similar to the circuitry of FIG. 2, the pixel circuit 30 can be coupled to multiple switching elements. For example, nodes N5-N7 can each be coupled to a corresponding transistor, just as nodes N1 and N2 of FIG. 2 are coupled to transistors T3 and T4. As a result, the leakage from nodes N5-N7 can be similarly accommodated as described above so that the difference between voltages at nodes N5-N7 can remain substantially similar, even though the absolute values may change.

Although a capacitor has been described coupling each gate to each other gate, the number and placement of the capacitors can vary. For example, capacitors can couple each gate to only a gate of a transistor to which a bias voltage is applied. In another example, each gate can be coupled to a capacitor coupled to a voltage source such as voltage source 32 or 34.

Figure 4:
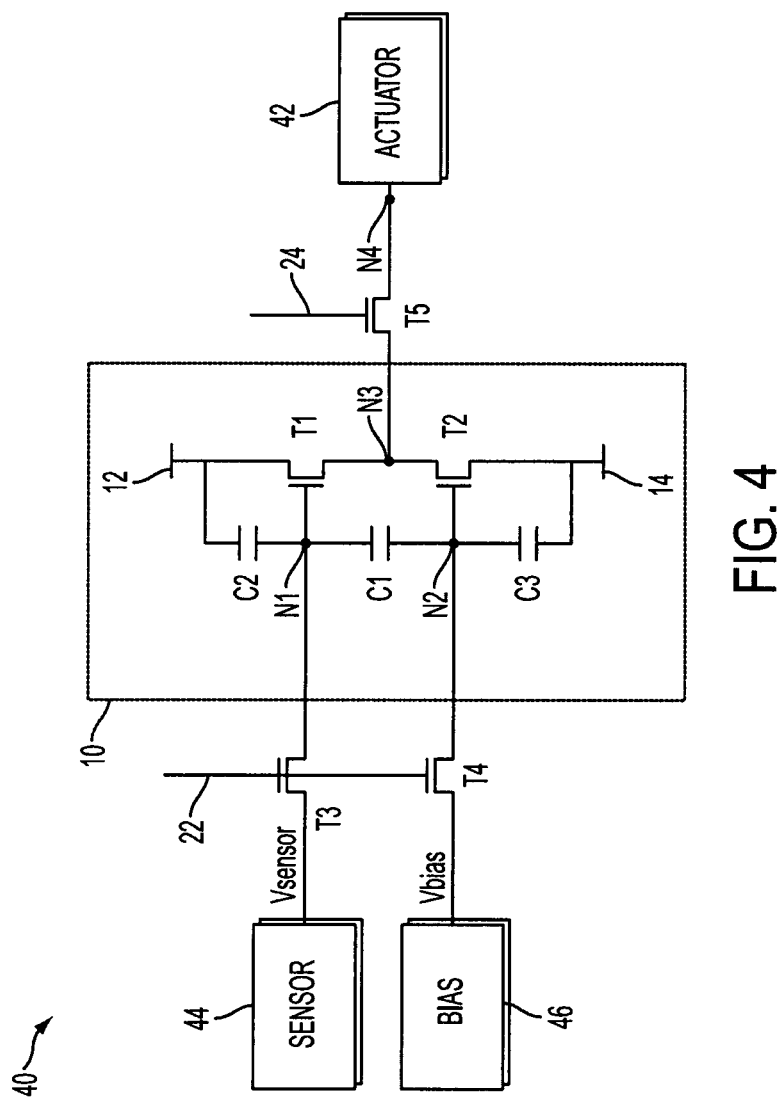
FIG. 4 is a circuit diagram of an application of the pixel circuit of FIG. 1.

FIG. 4 is a circuit diagram of an application of the pixel circuit of FIG. 1. In this embodiment, a sensor 44 and a bias circuit 46 provide inputs to the pixel circuit 10 through transistors T3 and T4. The sensor 44 can output a voltage Vsensor. The bias circuit 46 can output a bias voltage Vbias. As nodes N1 and N2 are charged to voltages Vsensor and Vbias, respectively, the voltage at node N3 becomes Vsensor−Vbias. Accordingly, not only is the output of a sensor 44 stored, but it can be level shifted by using an appropriate voltage Vbias.

The sensor 44 can be any variety of sensors. For example, the sensor can include PIN sensors, pressure sensors, temperature sensors, or the like.

In addition, the pixel circuit 10 can be used to drive an actuator 42. In this embodiment, the actuator 42 is used as a generic example of a circuit responsive to the stored sensor voltage Vsensor. For example, an actuator 42 can be a pixel of a display, a piezoelectric actuator, a MEMS device, or the like.

In another embodiment, the bias circuit 46 can be replaced with another sensor. For example, if the voltage generated by sensor 44 is referred to as Vsensor1, the voltage of the sensor replacing the bias circuit 46 can be referred to as Vsensor2. Accordingly, the voltage at the node N3 can become the difference, or Vsensor1−Vsensor2.

The gating circuitry of transistors T3, T4, and T5 allow the sensing of the sensor 44 and the actuation of the actuator 42 to be pipelined. For example, the sensor 44 can sense a first value that is applied to the pixel circuit 10. Once nodes N1 and N2 have been charged, the transistors T3 and T4 can be turned off by a signal on control line 22. At this time, the sensor 44 can continue to sense a different value while the previous value is maintained in the pixel circuit 10. In addition, the value stored in the pixel circuit 10 can be read out and applied to the actuator 42 by turning on transistor T5. Thus, while the sensor 44 is sensing a current value, a previous value can be stored and/or applied to the actuator 42.

Although the capacitors described above can be discrete from other components, lines, or the like, the capacitors can be wholly or partly integrated with the other components. That is, the structure forming the capacitance can be part of the other components. For example, with a capacitor coupled to a transistor, addition gate-drain overlap can be added so that gate-drain capacitance increases. If such a change is made to transistor T1 of FIG. 1, for example, all or part of the capacitor C2 can be formed by the gate-drain overlap. Similarly, plates of a capacitor coupled to a voltage source can be placed to overlap supply lines for the voltage source. For example, the plate of capacitor C3 of FIG. 1 that is coupled to node N2 can be located under a supply line for voltage source 14.

Figure 5:
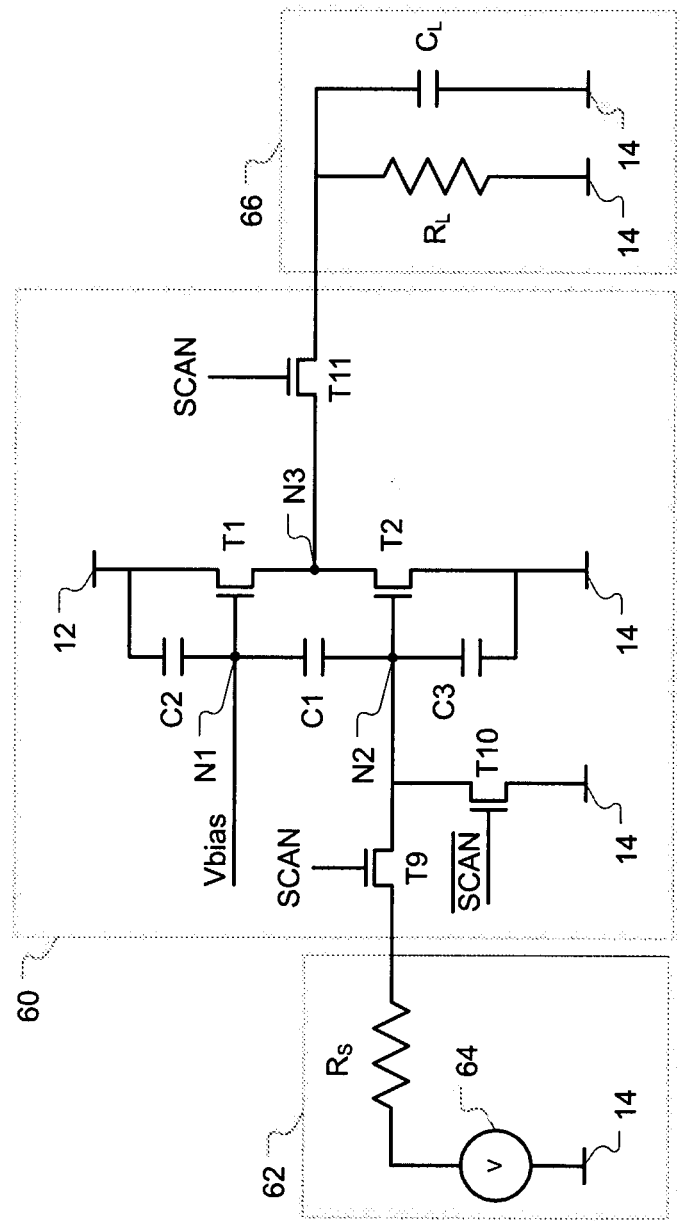
FIG. 5 is a circuit diagram of a pixel circuit, sensor, and actuator according to an embodiment.

FIG. 5 is a circuit diagram of a pixel circuit, sensor, and actuator according to an embodiment. In an embodiment, an electronic sheet can include an array of pixel circuits 60 each of which have an input and output. These pixel circuits 60 can have a sensor 62 as described above attached to the input and an actuator 66 as described above attached to the output. Resistor $R_S$ and voltage source 64 illustrate an example of a model for a sensor 62. Resistor $R_L$ and capacitor CL illustrate an example of a model for an actuator 66. These models are used only for illustration. Sensors 62 and actuators 66 can, but need not be in the configuration as illustrated.

In an embodiment, the pixel element 60 can operate to obtain the signal from the sensor 62 and deliver it in appropriate form to the actuator 66. Delivery in the appropriate form can include a variety of manipulation of the signal from the sensor, such as level shifting amplification, inversion, combination with other sensors 62, or the like such that the output can be within the operational levels of the actuator 66. In another embodiment, the pixel circuit 60 can deliver power to drive the actuator 66. Accordingly, the stability of a stored or sensed value can be maintained in addition to providing power to the actuator 66.

The pixel circuit 60 includes elements similar to the pixel circuit 10 of FIG. 1. The pixel circuit can include any variety of the pixel circuits described above. In this embodiment, the pixel circuit 60 is responsive to a control signal SCAN. Transistor T9 is coupled to transistor T2 and gate a signal from the sensor 62 into the pixel circuit 60. Transistor T11 is coupled to transistors T1 and T2, and can gate a signal out of the pixel circuit 60 towards the actuator 66.

The transistors T9 and T11 are both responsive to the same control signal SCAN. In an embodiment, transistors T9 and T11 can both be placed in a conducting state through the same state of the control signal SCAN. That is, when the control signal SCAN is enabled, the signal from the sensor 62 is processed in the pixel circuit 60 and at substantially the same time, the processed signal is output to the actuator 66.

Transistor T10, coupled to transistors T2 and T9, is responsive to the inversed of the control signal SCAN. Thus, the pixel circuitry 60 can be reset while the transistors T9 and T11 electrically disconnect the pixel circuit 60 from the sensor 62 and actuator 66.

Figure 6:
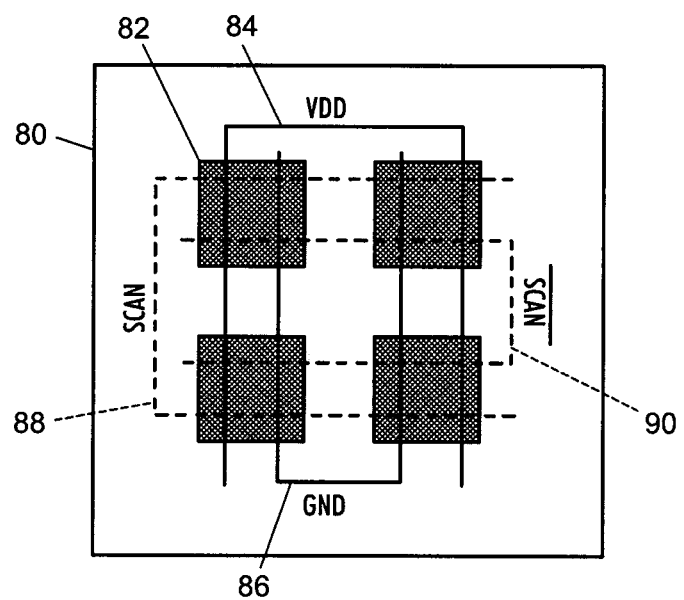
FIG. 6 is a plan view of an electronic sheet containing four pixels according to an embodiment.

FIG. 6 is a plan view of an electronic sheet containing four pixels according to an embodiment. The electronic sheet 80 includes multiple pixel circuits 82. The pixel circuits 82 are disposed in a grid pattern in this embodiment; however, the pixel circuits 82 can be disposed on the electronic sheet 80 as desired. An example of connections of power supply VDD, ground GND, controls signals SCAN and /SCAN are illustrated as connected to each pixel circuit 82. Although each pixel circuit 82 is coupled to the same control signals SCAN and /SCAN, any variety of connection of control signals to the pixel elements 82 can be used. For example, the same control signal can activate a row, column, area, or other grouping of the pixel circuits 82. Similarly, other connections to the pixel circuits 82 can, but need not be common. Moreover, the four pixels merely illustrate an example of an arrangement and number of pixels. Any number and arrangement can be used as desired.

Figure 7:
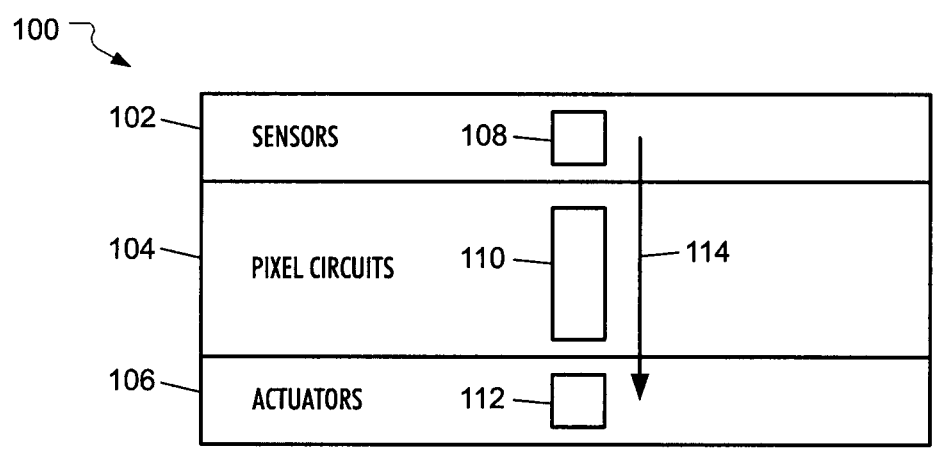
FIG. 7 is a cross-sectional view of an electronic sheet according to an embodiment.

FIG. 7 is a cross-sectional view of an electronics sheet according to an embodiment. The electronics sheet 100 includes a sensor layer 102, a pixel circuit layer 104, and an actuator layer 106. The pixel layer 104 is disposed between the sensor layer 102 and the actuator layer 106. The sensor layer 102, pixel circuit layer 104, and actuator layer 106 can include one or more sensors, pixel circuits, and actuators, respectively.

Individual sensors, pixel circuits, and actuators can have a particular physical relationship. In this embodiment, a sensor 108 in the sensor layer 102, a pixel circuit 110 in the pixel circuit layer 104, and an actuator 112 in the actuator layer 106 can be aligned with each other. For example, the sensor 108, the pixel circuit 110, and the actuator 112 can aligned along direction 114. In other words, referring to the plan view of FIG. 6, for example, the sensor 108, the pixel circuit 110, and the actuator 112 can be centered on one of the pixel circuits 82. The sensors, pixel circuits, and actuators of adjacent pixels can, but need not overlap. For example, from the perspective of a plan view, an actuator of one pixel can overlap a sensor or pixel circuit of one or more other pixels.

A result of such a structure in the electronic sheet is the absence of long routing wires to provide the information of the sensor to an external circuit and then bring back the appropriate signals back to the actuator. Instead, the electronic sheet can be pixilated grouping of stacks configured as sensor-pixel circuit-actuator. Thus, the information from the sensors of each pixel will go to the actuator through the stack. In other words information flow can be vertical along the direction 114 and not lateral.

This does not mean that signals cannot flow laterally through the electronic sheet. For example, as described above, pixel circuits can be offset from sensors and/or actuators. Thus, signals can flow laterally to accommodate the offset. The signals can remain substantially within the boundaries of a single pixel. However, signals can still be routed outside of pixels. For example, signals can still be routed to an external circuit.

Although the relationship of a pixel circuit to a sensor and/or an actuator has been described on a one-to-one basis, multiple sensors and actuators can also be connected to one pixel circuit. Digital logic circuits can control the connection of the sensors and actuators to the pixel circuit. The sensors and actuators coupled to the pixel circuit can, but need not be the same or similar. Thus, signals from a variety of different sensors can be provided to the pixel circuit, which can then be provided to a variety of different actuators. Similarly, multiple pixel circuits can also be connected to a single sensor or/and actuator through similar digital logic circuits.

Although a pixel circuit of a pixel of an electronic sheet has been described above, the pixel circuit is not limited to only the circuitry described above. The pixel circuit can include other circuitry for additional functionality in addition to the circuitry described above.

Although particular embodiments have been described, it will be appreciated that the principles of the invention are not limited to those embodiments. Variations and modifications may be made without departing from the principles of the invention as set forth in the following claims.

What is claimed is:

1. A pixel circuit formed using a disordered semiconductor, comprising:
   a first transistor electrically coupled to a first voltage;
   a second transistor electrically coupled to a second voltage different from the first voltage, the first transistor and the second transistor serially coupled between a first power supply terminal and a second power supply terminal;
   a first capacitor coupled between a gate of the first transistor and a gate of the second transistor; and
   a third transistor coupled between a node between the first transistor and the second transistor and an output node.

2. The pixel circuit of claim 1, further comprising:
   a third transistor coupled to the gate of the first transistor.

3. The pixel circuit of claim 2, wherein a gate of the third transistor is coupled to a write enable signal line.

4. The pixel circuit of claim 1, wherein a gate of the third transistor is coupled to a read enable signal line.

5. The pixel circuit of claim 1, wherein a gate of the first transistor is coupled to the first power supply terminal.

6. The pixel circuit of claim 1, further comprising:
   a third transistor coupled to the gate of the first transistor; and
   a fourth transistor coupled to the gate of the second transistor.

7. The pixel circuit of claim 6, wherein:
   each gate of the third and fourth transistors is coupled to a write enable signal line.

8. The pixel circuit of claim 6, wherein:
gates of the third and fourth transistors are coupled to different control lines.

9. The pixel circuit of claim 1, further comprising:
a second capacitor coupled between the power supply and the gate of the first transistor; and
a third capacitor coupled between the gate of the second transistor and the second power supply terminal.

10. A pixel circuit formed using a disordered semiconductor, comprising:
a plurality of transistors coupled together in series;
a plurality of capacitors coupled to the transistors such that each transistor is coupled to each other transistor through at least one of the capacitors; and
a plurality of switching elements, each switching element coupled to a gate of a corresponding one of the transistors.

11. The pixel circuit of claim 10, wherein for each pair of transistors from among the plurality of transistors, gates of the pair of transistors are coupled through one of the capacitors.

12. The pixel circuit of claim 10, wherein:
a gate of at least one of the transistors is coupled to a power supply through one of the capacitors.

13. An electronic sheet formed using a disordered semiconductor, comprising:
a sensor layer including at least one sensor;
a pixel circuit layer including at least one pixel circuit, wherein the pixel circuit comprises
a plurality of transistors coupled together in series; and
a plurality of capacitors coupled to the transistors such that each transistor is coupled to each other transistor through at least one of the capacitors; and
an actuator layer including at least one actuator;
wherein the pixel layer is disposed between the sensor layer and the actuator layer.

14. The electronic sheet of claim 13, the plurality of transistors referred to as a plurality of first transistors, wherein the at least one pixel circuit comprises a second transistor coupled between one of the first transistors and a sensor of the at least one sensor.

15. The electronic sheet of claim 13, the plurality of transistors referred to as a plurality of first transistors, wherein the at least one pixel circuit comprises a second transistor coupled between one of the first transistors and an actuator of the at least one actuator.

16. The electronic sheet of claim 13, the plurality of transistors referred to as a plurality of first transistors, wherein the at least one pixel circuit comprises:
a second transistor coupled between one of the first transistors and a sensor of the at least one sensor; and
a third transistor coupled between another one of the first transistors and an actuator of the at least one actuator;
wherein the second transistor and the third transistor are electrically conductive in response to a same state of a control signal.

17. The electronic sheet of claim 13, wherein:
a pixel circuit of the at least one pixel circuit is disposed substantially between a sensor of the at least one sensor and an actuator of the at least one actuator.

* * * * *